SINGLE STANDING WAVE RADIO CIRCUIT

Filed Nov. 16, 1943

INVENTORS
JULIUS W. MANN
BY GEORGE F. RUSSELL
Munn, Liddy & Glaccum
ATTORNEYS

Patented May 2, 1950

2,506,158

UNITED STATES PATENT OFFICE 2,506,158

SINGLE STANDING WAVE RADIO CIRCUIT

Julius W. Mann and George F. Russell,
Tacoma, Wash.

Application November 16, 1943, Serial No. 510,566

5 Claims. (Cl. 250—36)

The present invention relates to improvements in a single standing wave radio circuit, and it consists of the combinations, constructions and arrangements hereinafter described and claimed.

An object of our invention is to provide a single standing wave radio circuit in which the plate, grid and output circuits function as one circuit for radio frequencies and may be adjusted with one variable condenser; the output component having an inductance with its current anti-nodal point lying adjacent to the current anti-node of an inductance in the plate tank component. This application is a continuation in part of our copending application on a radio circuit Serial Number 407,530, filed August 20, 1941, now abandoned.

A further object of our invention is to provide a radio circuit which has but one fundamental radio frequency circuit including the capacitance (load) as part of this circuit and functioning as a simple wave meter with a full standing wave resident thereon, a one-half standing wave residing within the boundaries of the inductance and the other one-half standing wave residing within the boundaries of the capacitance. We have found that when there is only one full standing wave resident in the circuit, the partial in-phase relationship between the voltage and the current within the inductance boundaries will give a power component in the inductance having two crests, each being disposed in a balanced design an equal distance from the center of the inductance. The means for imparting a restorative force to the circuit provides grid leads adjustably tapped to an output-work inductance in the neighborhood of these power crests, whereby the grids receive the greatest excitation and result in maximum swing and cause the circuit to impart and dissipate the greatest possible power.

The stability and symmetry of the fundamental circuit is such that proper adjustment of the capacitance and inductance results in oscillation even when no dielectric is inserted in the capacitance nor a conductor inserted in the inductance for dielectric or inductive heating. Upon insertion of either a dielectric in the capacitance or a conductor in the inductance, the fundamental circuit will be brought into balance and resonance without further adjustment so that maximum power output may be effective on the load.

Not only will there be two crests in the power components of the inductance portion of the circuit, but there will also be two additional crests in the power components of the capacitance portion. In our copending application on a Process of controlling the placing of the heat in the interior of material by a radio frequency standing wave, Serial No. 511,882, filed November 26, 1943, now abandoned, we disclosed how these two power crests in the capacitance will heat a dielectric placed in the capacitance at two separate points within the dielectric. Our copending case further discloses how the power crests may be altered in their position within the dielectric so that a dielectric may be heated at spaced points with the heat between the points being of less intensity, how the dielectric may be fairly uniformly heated in the center portion and how the dielectric may be internally heated by a practical merging of the two hot spots into one to cause extremely great heat in the center.

Other objects and advantages will appear in the following specification, and the novel features of the device will be particularly pointed out in the appended claims.

Our invention is illustrated in the accompanying drawing forming a part of this application, in which.

While we have shown the preferred form of our radio circuit it should be understood that various changes or modifications may be made within the scope of the appended claims without departing from the spirit and scope of our invention.

In carrying out our invention we first show the fundamental differences between a travelling and a standing wave, and then we will show how only one standing wave resides in the fundamental circuit of our radio circuit and why our radio circuit operates more efficiently because of this fact.

Figure 1:
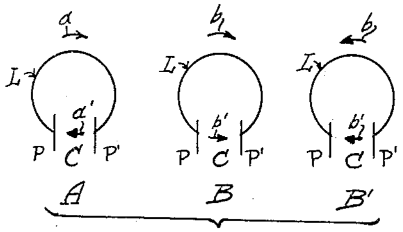
Figure 1 is a schematic view of a simple wave meter, sketch A illustrating the travelling wave theory and sketches B and B′ the standing wave theory.

Figure 1 illustrates a simple wave meter at A with a traveling wave thereon. The arrow *a* indicates the flow of electrons from the plate P to the plate P′ through the inductance L and the arrow *a′* indicates the flow of electrons from the plate P′ to the plate P through the capacitance C. This is the accepted theory of a traveling wave with uniform distribution of electron displacement throughout.

Figure 2:
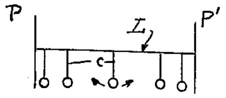
Figure 2 is a diagrammatic view illustrating the motion of the electrons in the standing wave theory concept.

The simple wave meter shown at B and B′ illustrates a standing wave of energy distributed along the system. The arrow *b* indicates the direction of electron displacement from the plate P to the plate P′ through the inductance L. Note from Figure 2 that the electrons in the wire "sit" and "flow," that is, the electrons nearest the plates P and P′ have the least swing on their ordinates *c* while those midway between the plates on the inductance L have the greatest swing, i. e. at the current antinodal position. Another way of stating the same theory is to say that the electrons nearest the plates P and P′ are bunched together while those at the center of the inductance or the current anti-nodal position are spaced farther apart and have a greater swing. This is non-uniform distribution of electron displacement, and results in an alternate condensation and rarefaction at the respective plates.

The electron displacement in the condenser C in the wave meter B is away from the plate P and toward the plate P′ as shown by the arrow *b′*. This is exactly opposite to the flow when considering the traveling wave theory. The electrons in the condenser C in the wave meter B, sit and flow in the same way as they do in the inductance. The displacement of electrons through the inductance and the capacitance is simultaneously away from the negatively charged plate and toward the positively charged plate. The wave meter at B′ in Figure 1 illustrates the second half of the cycle, i. e. the return displacement from the plate P′ back to the plate P through both the inductance and the capacitance.

Figure 3:
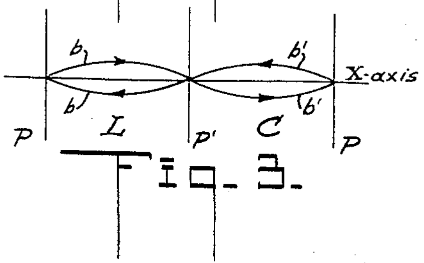
Figure 3 is a graph illustrating the simultaneous flow of an electron wave from one plate of the condenser to the opposite plate through the inductance and capacitance, and back again.

The graph in Figure 3 combines the two half cycles of the wave meter shown at B and B′ and illustrates one full cycle. The inductance and capacitance are stretched out along the X-axis and the wave flow in the inductance L is indicated by the graph lines *b* and that in the capacitance C by the graph lines *b′*. The plate P is indicated twice to complete the graph.

Figure 4:
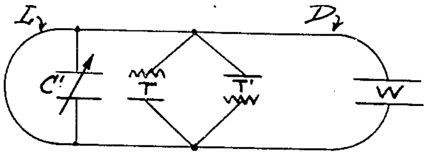
Figure 4 is a schematic wiring diagram illustrating the placing of additional condensers in parallel with the condenser shown in the simple wave meter circuit of Figure 1B.

The simple wave meter shown at B may have additional capacitances which if they parallel the capacitance C, they will not affect the single standing wave resident thereon. In Figure 4 we illustrate the simple wave meter D made up of the inductance L and capacitance W and having a standing wave thereon, one-half the wave residing within the boundaries of the inductance L and the other one-half residing within the boundaries of the capacitance W. A variable condenser C′ is connected to the inductance L and is in parallel with the capacitance W. Two vacuum tubes T and T′ are shown shunted across the inductance and are in parallel with each other and with the condensers C′ and W. Since all four capacitances are in parallel, the standing wave in the inductance L and capacitance W is not affected.

Figure 5:
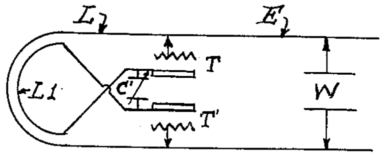
Figure 5 is a schematic wiring diagram illustrating a method of introducing restorative force to a simple wave meter shown in Figure 4.

Coming now to Figure 5, we find the simple wave meter E with the work condenser W adjustable at the extremities of the inductance L. The variable condenser C′ is connected across the plates of the tubes T and T′ and the plate circuit has its inductance L1 inductively coupled to the current anti-nodal position of the inductance L. There is a grid to plate capacity which is in series with the variable condenser C′ so we have the three condensers in series paralleling the work condenser W.

Figures 6, 8:
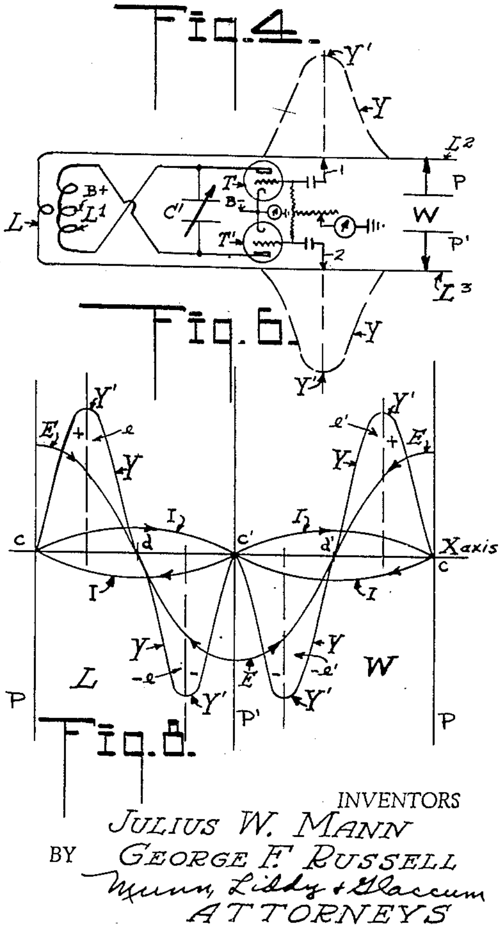
Figure 6 is a wiring diagram similar to Figure 5, but showing a more complete circuit diagram.
Figure 8 is a graph illustrating the two energy crests in the inductance and the two energy crests in the capacitance when voltage and current are 90° out of phase.

Figure 6 illustrates the final step with the tube cathodes connected together, the plate leads crossed and blocking condensers placed in the grid leads. The simple wave meter is still present and but a single standing wave resides thereon. A restorative force is applied to the master oscillating circuit by the vacuum tubes. This radio circuit is the same in operation as the one shown in Figure 1 of our copending case Serial No. 407,530, and shown in Figure 7 of the present drawings. Either the plate leads or the grid leads may be crossed.

Figure 7:
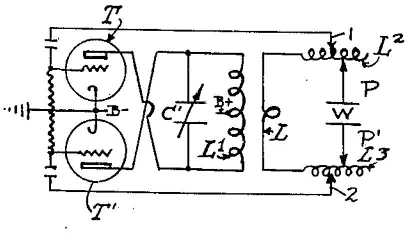
Figure 7 is a wiring diagram similar to Figure 1 in our copending application, Serial No. 407,530.

It will be seen that Figure 7 is similar to Figure 6 if the inductance L in Figure 7 is enlarged so as to include the plate tank circuit within itself, and if the showing of the plate tank circuit, in Figure 7 is reversed so that its inductance L1 will be to the left of the tubes T and T′ and in inductive relation to the enlarged inductance L. The grid leads and taps would also be shown falling within the work inductance L rather than on the outside as in Figure 7.

There are a number of advantages derived from establishing only one single standing wave in the fundamental circuit and of making the work circuit a part of the fundamental circuit. In the first place the inductance portion L, see Figure 6, has a one-half standing wave thereon and the capacitance portion W has the other one-half standing wave portion residing therein. Theoretically the voltage will be 90° out of phase with the current when there is do dielectric in the work condenser W and when the resistance of the circuit is zero. From the practical side, there is sufficient energy absorption in the circuit to cause the voltage and current curves to be brought partially into phase.

This is shown graphically in Figure 8 where for sake of clarity the current curve I is shown 90° out of phase with the voltage curve E. The resulting power curve from the two current and voltage components is shown at Y. It will be noted that there are two crests Y′ in the power curve Y that lie on opposite sides of the X-axis and are within the inductance portion L of the fundamental circuit. There are also two additional crests Y′ in the power curve Y in the capacitance portion W of the circuit and these lie on opposite sides of the X-axis. In our copending application on a Process of controlling the placing of the heat in the interior of material by a radio frequency standing wave, Serial No. 511,882, we show the advantages of using the two power or energy crests for heating a dielectric internally and of positioning the crests Y′ at different points for accomplishing different types of heating.

In the present case, we will confine ourselves to showing the decided advantages of utilizing the energy crests Y′ in the inductance to cause the fundamental circuit to operate at maximum efficiency. In Figure 8, we show the power crests Y′ in the inductance substantially one-fourth the distance of the entire inductance from the plates P, P′ of the work condenser W. The adjustable grid taps 1 and 2 in Figure 6, connect to the inductance L at about one-fourth the electrical distance of the entire inductance length, from the plates P and P′ of the work condenser W. The dotted curved power line crests Y′ shown in Figure 6, correspond to the same two power crests Y′ in the inductance portion L of the graph shown in Figure 8. The taps 1 and 2 therefore connect with the inductance L at the points of highest energy activity. This is a very important point and means that the grid excitation will be governed by the most energized portions of the inductance, i. e. the portions that have the energy crests Y′ residing therein. In our copending application, Serial No. 482,646, filed April 10, 1943, Patent No. 2,382,435, granted August 14, 1945, we show novel means for adjusting the grid taps along the inductance L. The fact that the grid taps do connect with the two greatest energy crests on the inductance means that the tubes will instantly respond to any change in energy consumption caused by placing a dielectric in the capacitance W.

The fundamental circuit will oscillate when there is no dielectric placed in the work condenser W or when there is no conductor placed in the inductance L for heating. When an energy consuming dielectric is placed in the work condenser W, the voltage curve will be brought more into phase with the current curve, as explained more in detail in our copending application, Serial No. 511,882, and this will change the positioning of the energy crests Y′ residing on the inductance L. The grid leads pick up the energy and will cause the tubes to increase their swing so that increased energy will be delivered to the dielectric in the work capacitance. The increase in power consumption in both the plate and grid circuits can be detected with proper electrical measuring instruments.

When the fundamental circuit is used for heating a number of dielectrics or conductors successively, i. e., the batch method, the variable condenser C′ may be adjusted so that a dielectric inserted in the capacitance or a conductor inserted in the inductance will bring the entire circuit without additional adjustments into balance and resonance so that maximum power output will be effective on the load. In our copending application on a self-compensating condenser, Serial No. 511,358, filed November 22, 1943, now abandoned, we show novel means for maintaining the capacity of the work condenser constant irrespective of the shape, size or dielectric constant of the dielectric received in the work condenser. In this way the fundamental circuit is maintained in relative capacative balance whether or not a dielectric is received in the work condenser W.

It will be seen from the foregoing that our fundamental circuit has two points in the inductance of greatest power dissipation and these points are used for grid excitation. The fundamental circuit also has two points in the capacitance of greatest power dissipation which may be used for heating a dielectric internally at these same two points. Using the two points in the inductance of greatest power dissipation for grid excitation makes the circuit sensitive so that the placing of a dielectric in the work condenser will cause the current flowing in both grid and plate tank circuits to rise together. At the same time the set is stable because only one single standing wave resides on the fundamental circuit and the grid taps on the inductance at the greatest points of energy loss and the close coupling between the inductances of the fundamental circuit and plate tank circuit make all of the circuits act as one and controlled by either the grid taps or the condenser C′, or both. In other radio circuits where the output circuit is inductively coupled to a master oscillator rather than forming a part thereof, too close a coupling between the separate circuits will cause the generator to cease oscillating and the tubes to function as rectifiers.

The frequency range of our radio circuit is flexible and allows wide variations in capacity or load of output circuit without change being made in the frequency setting of the plate tank circuit, which maintains during such swing a stability in the oscillator unheard of before. The wide range fluctuation adapts the radio circuit to signal transmission over a broad band of frequencies simultaneously. By using a blanketing signal, it is possible to blind radio receivers. It can be an energy source for heat treatment of live tissue as in diathermy or surgical work. Inanimate material as well as animate may be treated. The efficiency with which the radio set transfers energy far surpasses anything known at present.

The inductances L and L′ have a minimum capacitive coupling therebetween at the voltage antinodes (where the voltage is high), and a closest possible coupling at the current antinodes (where the current is high). In our copending application, Serial No. 451,064, filed July 15, 1942, now abandoned, we disclose and claim concentric coupling between two coils. This is accomplished by causing the inductance L following the inductance L′ to only a limited physical extent and in bringing the leads away from capacitative coupling to reduce the effect. A greater frequency range is possible by close coupling than by loose coupling. In loose coupling, the rise to resonance peak is sharper and in close coupling the rise to resonance is broader. Loose coupling is good for radio communication, since it sharpens tuning, but it reduces energy transfer. Close coupling is desirable in heating operations. It is not necessary that L and L′ be arranged in concentric manner; they may be inductively coupled in other manners. The coils L and L′ could be one and the same, but blocking condensers would have to be used to insulate the grids from the high voltage used on the plates.

The self-excited master oscillator with its flexibility in frequency range allows the fundamental circuit to follow wide changes in resonant frequency of particular loads or dielectrics with only one variable tuning member, the condenser C′ without too great a loss in power transfer. The radio circuit can be used in various ways; it can be used as an oscillator, amplifier, buffer or driver, etc. It is possible to use the circuit for blocking off communication between enemy motorized units by transmitting a signal on a wide and continuously adjacent band of frequencies. This will blanket powerful single signal receivers over so wide a range as to render them useless for reception on given bands.

The number of parts are reduced in the set and there is easier adjustment because of the single control and the symmetry of the parts making up the set. The normally complicated method of seeking resonance is simplified. The principals of design employed can be used for transmission or reception, both with startling success. The set changes an amazing percentage of inputpower into the work circuit for heating dielectrics such as wood, plastics, etc.

The existence between two plates of a condenser of a half-standing wave is commonly denied because it is held that a standing wave cannot be bunched in air. We have found that a half-standing wave may be bunched in air or in a vacuum in a manner similar to the bunching of a standing wave on a conductor. We have determined the existence of a half-standing wave between the electrodes when constituting a condenser and also when constituting a part of the capacitance of a resonant circuit. The size of these electrodes for illustration may be infinitely variable as shown in our copending application on a Self-compensating condenser for heating dielectrics with radio frequency waves, Serial No. 511,358 filed November 22, 1943. We have found that a one-half standing wave exists between two electrodes, each constituting as little as twenty square inches of area and separated by no more than two to five inches; and we have found the same condition between electrodes each five hundred square inches in area and separated eight to ten inches apart.

The frequency at which these experiments were conducted varied from ten to fifty megacycles and in the case of the small electrodes, the frequency was thirty megacycles. According to present accepted authorities, it would be impossible for a half-wave to stand between surfaces only five inches apart because the physical length of a half-wave at thirty megacycles is many times the distance. Experts agree that there exists between the plattens of such electrodes a gradient of voltage; we have found that all of the components of a half-standing wave reside between the plattens of a condenser in a simple single standing wave system.

The inductance and capacitance of a standing wave resonant circuit serve as general boundaries for the standing wave forms or gradients resident in the circuit. The plattens of the condenser serving as a capacitance in such a simple resonant circuit are not necessarily the exact specific points at which current nodes and voltage antinodes may evidence themselves. Depending upon the overall capacitance and design, these positions merely serve as boundaries wherein the general area constituting a combination of inductance and capacity which together form the area of these respective boundaries. It is quite possible, however, that in a single standing wave system, the plattens of the capacitance serve more or less as exact boundaries of these points of currents node and voltage antinode.

Evidence is convincing that in a simple symmetrical system of zero resistance, the two current antinodes of a single standing wave fall respectively at the center of the inductance and at the center of the capacitance, while the voltage nodes fall at these same points. The capacitance in such a simple system serves as a boundary for one half of a full standing wave and the inductance serves as a boundary for the other half of a full standing wave and so in a simple oscillating system, there is resident one full standing wave which is the resultant of the fields of force with their respective nodal and antinodal points placed in conformance with the boundaries provided by inductances and capacity.

This invention eliminates the necessity of matching impedance and resonance as between a master oscillator and a separate output circuit by eliminating all but one fundamental resonant circuit which in itself constitutes all elements of the generator, but which at the same time includes a work load as an inherent part of its inductance and capacity. A restorative force can be applied to our single standing wave circuit without increasing the number of standing waves resident in the circuit.

For resistance introduced in a sixty cycle circuit, the phase shift results and the power loss may be calculated effectively by the vector method which shows total average power expended. The vector only shows the total of the whole effect. The travelling wave studied by vector diagrams shows the average effect over long distances. The standing wave studied by chart diagrams does not average its effect but in another way maintains fixed and identifiable positions of energy conversion.

The power distribution effects in a one-half standing wave cannot be shown by averages as if by vector analysis. The vector method might lead to the belief that heat distribution is uniform. The analysis of heat distribution by standing waves shows actual placement.

It is in the construction and adaptation of this circuit to the purposes of heating wood, setting glue lines, preheating plastic preforms, drying materials and other processes, which has led to the discovery that in this circuit where the parts are properly proportioned and symmetrical, there is resident only one full standing wave. Two or more multiples of half-standing waves may become resident, but with proper design and construction, this unit is so simple and stable that parasitics do not creep in, nor will the circuit as a unit become the breeding place for spurious oscillations.

In any radio circuit where there is more than one full standing wave, spurious frequenies and harmonics are likely to develop to plague the designer and parasitics, jump frequencies, heat losses and other undesirable evidences may crop up. Where there is but one single standing wave even variable as to frequency over a range of adjacent frequencies by a variation of one or more of the component parts of the circuit, much of the misfortune created by the growth of parasitics and spurious frequencies is eliminated. This single standing wave operation makes feasible a radio generator wherein the load, be it metal, or be it a dielectric, in which a heating loss takes place, constitutes a fundamental part of the inductance and/or capacity of the oscillating system.

As heat is created in the work, it acts as a loss in some component part of a circuit, as in the case of wood, and then the dielectric constant of the load changes. This in turn changes the components of the circuit so that a change of frequency is the common result. Therefore, as heat is introduced into the load, or a heating loss takes place, unless the radio generator is able to change with the dielectric constant of the load and compensate therefore in some other component of the circuit, or unless the output circuit maintains resonance with the frequency of the master oscillator, a decrease in efficiency of the output results.

Where a load constitutes a part of the capacitance of a separate resonant circuit tuned to the fixed frequency of a master oscillator, as is the current practice, when such dielectric loss takes place, it is necessary to re-adjust the frequency and impedance of the load circuit to conform with that of the master oscillator or generator. This necessitates a constant revision of tuning in such a system as contains two or more circuits in which there is resident in each circuit one or more separate standing waves.

By making the load a part of the master oscillator or generator, wherein there exists only one single full standing wave, in which the load constitutes a part of the circuit itself, there is eliminated the necessity of matching resonance and impedance between the generator and a separate output circuit or as between two separate and distinct circuits wherein there is resident more than one standing wave.

As heating takes place and the dielectric constant changes where the load is a part of a single standing wave generator since there is no other circuit with which resonance and impedance must be constantly matched, very little decrease in efficiency of output is experienced. For what little decrease there may be, small compensations in other components of the circuit may be easily made to maintain efficiency at a maximum during change in the dielectric constants of the load. In the circuit of Figures 6 or 7 since the dielectric in the load W is a part of the total capacitance small variations of the variable plate tank condenser C′ may be made to compensate for dielectric constant changes and thus the output of the circuit may be maintained at a maximum.

If the dielectric change is relatively large for big loads, adjustment to the grid vernier adjustment taps 1 and 2 along the sides of the output grid inductances L2 and L3 may be made along with the adjustments to the plate tank capacitance C′. In the case of wood, for example, the dielectric constant will change as the wood loses moisture, and this will necessitate a reduction of the wavelength or an increase in the frequency to maintain the tube output at a maximum. Both plate tank capacitance and grid tap adjustments will be made in the same sense during such a dielectric change—and both may be made during the operation without the necessity of stopping the oscillator from operating. This particular phase of adjustment during full operation offers a particular advantage in maintaining maximum output efficiency.

As such dielectric change takes place in a circuit as shown in Figures 6 and 7 and as adjustments are made in other components of the circuit to compensate for the dielectric change in order to maintain maximum performance, the frequency of the entire oscillator or generator will gradually shift. This variation of wavelength or frequency in the master oscillator offers many advantages. In this circuit, as has been described, there is eliminated the necessity of matching a separate load circuit to the resonant circuit, because the load forms a part of the circuit itself. The single wave system resulting from such a circuit permits the frequency to be varied and enables the circuit to be adaptable to an infinite variation of load sizes and shapes. The dielectric change in the load is readily compensated for by parallel capacitances thereby maintaining a maximum efficiency during the entire operation of the circuit.

Our discovery that a full standing wave is resident in a simple wave meter circuit is confirmed not only by the distribution of the fields of force across the capacity members of such a system, but also by the distribution of voltage and current within the induction portion thereof. It is commonly accepted that a current measuring device placed at any point along the inductance of a simple resonant wave meter system will register equal distribution of radio frequency current. Our findings dispute such theories of even distribution of radio frequency current and confirm definite gradients of both voltage and current existing in the inductance portion of the circuit. One current antinode, in a symmetrical system is located at the physical center of the inductance and it is at this point that the current is greatest. At symmetrical points away from the center point of the inductance, current distribution is such that a lesser amount appears on the current measuring device. The greater the distance one moves away from the center point the less will be the current reading until the so-called boundary of the standing wave current node and voltage antinode is reached. It is at such a boundary point that no current will exist in the circuit and the voltage will be at its maximum in their 90° out of phase relationship.

Electromagnetic field distribution in the capacitance portion of such a single standing wave meter system is confirmed by other experiments such as the burning of wood, etc., when placed between the plates of the condenser. In many cases, it has been found that by an improper proportioning of either inductance or capacity or both, more than one full standing wave can be made to reside in the system, but heat is generated within such wave boundaries somewhat in proportion to the resistance, and waste is thereby experienced. When this condition is in effect, the boundaries such as might obtain in a single wave system, are disturbed and distorted. Once a particular proportioning and symmetry of parts have been obtained for a given frequency, the limits within which adjustments may be made before arriving at a point where more than one standing wave is made to reside in the system can be easily determined.

In the processes of heating materials by the penetration of radio frequency waves or by the creation of what is commonly called displacement currents within the material, it is the desire to create a heat loss within the dielectric rather than a heat loss in the component parts of the resonant generating circuit. There are two current antinodal positions in each full standing wave, and each is a boundary within which heat may be created. By a simple rule of thumb, we might conclude, therefore, that since heat is generated adjacent to the current antinodal positions in a system, if there is resident in that system more than one full standing wave, undesirable heat losses may occur in proportion to the number of current antinodal areas in excess of two. If, on the other hand, we can limit the current antinodal positions in a system to only those which are the fundamental components of a single standing wave, by placing the load in the boundary of one such current antinodal position, or within the boundaries between which half-standing waves fields of force are resident, we will utilize the maximum amount of heat capable of being created within a given oscillating system. Naturally, if heat is wasted in certain components of the generator such heat cannot be utilized in the work.

This is one reason why in our design we confine the master oscillating system, in which the work constitutes a fundamental part of the inductance and capacity, to one one which there sits but one full standing wave of radio frequency energy. It is one purpose of this invention, therefore, to place the work in the fundamental master oscillator as a part of its inductance and capacity, to maintain residence in such circuit of but one single full standing wave and so to utilize a maximum possible amount of energy in the form of heat done in the work.

Because a high voltage direct current component must utilize the plate inductance for the maintenance of the restorative force of the B supply to the plate, it is desirable and preferable to establish the dielectric loss in the radio frequency half-standing wave in the grid circuit's capacitance W, where high direct current voltages will not become a disturbing factor, to operators or others who might come in contact with the load circuit.

Setting the overall capacity of the grid circuit including the high loss dielectric within a range so that the entire circuit may be varied in frequency by controlling the capacitance in the plate tank circuit, allows easy adjustment of the amplitude of the plate and grid swings in relation to the cathode.

We desire to maintain in the radio frequency components of whatever system is used a single standing wave system, wherein there is resident only one full standing wave as has been described above. In this manner we eliminate the necessity of resonance matching as between circuits where there is more than one standing wave. In the ordinary tuned grid tuned plate push-pull circuit we find that there are really two separate tank components—a grid system and a plate system separately tuned, but coupled together capacitively through two or more vacuum tubes.

In the system shown in Figures 6 and 7 where the coupling relationship between the grid and the plate tank circuits is such as to make the mutual inductance L and L′ a single inductance for radio frequency; taking one tube out of such a system merely reduces the total capacity of the single standing wave system and neither destroys the inductive or capacitive relationship between the grid and the plate nor destroys the oscillation. In this manner of interrelating the inductance and capacity of the circuit so that the vacuum tube in effect forms an additional capacitance in parallel with the basic capacitance of the simple single standing wave system, we introduce restorative force into the system through the vacuum tubes without the necessity of increasing the number of full standing waves of electromagnetic energy, and we therefore maintain the simple boundaries in the system which form a residence for but one full standing wave. This is one of the fundamental points of our invention and marks a basic difference between the design of circuits around the fundamentals of standing wave placement and the design of circuits around separate coupled components each consisting of tank circuits resonant in themselves.

When the circuit of Figures 6 and 7 is employed as a master oscillator with the load forming a part of the capacitance of the circuit itself, the energy supplied as restorative force through the vacuum tubes maintains oscillation and the system does not require frequency or impedance matching with any other circuit. By varying the capacitances in the circuit, a maximum grid swing may be obtained which results in a maximum tube performance; varying the said capacitances varies the amplitude of the grid swing and both grid and plate currents rise and fall together. No "wiggling in" is required to obtain maximum tube performance because there is no separate load circuit with which it is necessary to match resonance and impedance.

Added advantages of the described circuit and standing wave method of design in which the work performs the duty of being a part of the capacitance of the master oscillator and wherein resonance is limited to a single full standing wave are numerous.

When the grid and plate current rise together to a peak of vacuum tube performance with but one major control in the circuit a simplified operation becomes possible eliminating all necessity for impedance matching or "wiggling in" to raise tube performance. When the load or work is a part of the capacitance in a single wave oscillating system, a change in its dielectric constant may measure the degree of work done. There is no necessity for loose coupling a separate load circuit to a master oscillator or other source of energy, so the losses inherent in a multiple standing wave system will be reduced and overall efficiency increased. The frequency of a master oscillating system in which the load is a part of the circuit is variable over a wide range and will maintain stable oscillation over that range; it is fixed to no one frequency, but will oscillate at maximum efficiency at a number of different frequencies adding flexibility of load range to its qualities.

Loads may either contact or be spaced away from the electrodes in a single standing wave system without impairing its output efficiency, lending itself to a multiplicity of uses where it may not be practical for the load to make direct contact with the electrodes between which stands the field of force the phase shift between the elements of which causes heat.

So far we have disclosed the matter of obtaining and maintaining the advantages which result from a single full standing wave oscillating system. This invention is, however, not limited to those factors. The placement of the heating effect as between the capacitance and inductance portions of the system is of utmost importance in the proper use of such a system. Further, the proper design and use of heating effect in a dielectric placed in a capacitance of the system is where the practical application of the invention ties in with its use in production processes. An analysis of power utilization therefore will further clarify the invention.

The association of inductance and capacity as in a simple wave meter or oscillating system is represented graphically in Figure 3. The two plates P and P′ represent capacity C and the inductance L is stretched out in a straight line and is connected to the same plates.

Assume an electronic oscillator composed of a capacitance (W), see Figure 7, whose dielectric losses approach zero. Then the electron displacement or current in the oscillator will lag the voltage by approximately 90°, as shown in the graph Figure 8. Under these circumstances an initial quantity of energy applied to the system as a charge would damp out in the form of heat very slowly and electron oscillation both in the dielectric and inductance would persist for a correspondingly long period of time.

At the instantaneous positions *c, c', c* along the graph, Figure 8, the whole energy imparted in the system exists in the form of potential energy due to these positions being those points of alternate maximum concentration and rarefaction of electrons. The field of force associated with this state is known as electrostatic field. At the instantaneous position *d, d'*, the whole energy has been converted into the kinetic state and the field of force associated with this state is known as a magnetic field. At this instant both plates P and P' are equally charged. On the average, 50% of the energy exists as potential and 50% as kinetic energy.

The curve Y in Figure 8 represents the rate of change of energy from one state to the other with respect to time and the sum of areas *e* and *e'* represents the total energy originally imparted to the system because in the standing wave condition, the electron displacement is from one plate P of the capacity to the opposite plate P', through the dielectric of the capacity and also through the material of the inductance simultaneously. Note the direction of the arrows shown in Figure 8. In the same figure, the area of the negative loops of *—e, —e'* about equals the area of the positive loops, thus indicating an approach to zero total loss of energy in the circuit. In our copending application, Serial No. 511,882, we will show what happens to the power curves Y when the voltage curve and current curve are brought more into phase with each other.

Within the atomic and molecular systems composing the dielectric, a portion of the kinetic energy of electron displacement is converted to heat energy. The energy loss is directly proportional to the number of atoms and/or molecules which compose the volume of the dielectric. Thus in the broad sense of the term resistance grows greater as the volume of dielectric is increased. On the other hand, the resistance of the inductance loop is ohmic in its characteristics, the resistance increasing as the frequency increases due to skin effect. The so-called resistance of the dielectric changes with frequency.

The variable condenser C' is in parallel with the work condenser W. Both condensers can be adjusted to balance at the best point of grid excitation. The work condenser W may be fixed as to capacity. The placing of a dielectric in the work condenser will consume energy from the work circuit and the wave length will decrease. The variable condenser C' can be unmeshed to lower the wave length of the total capacitance and keep it in balance with the work output circuit. Since the output circuit condenser W is a constant, there is only one variable condenser C' to control. The total circuit can have a wave length variation up or down of as much as 20%. As the grid inductance L is reduced by the dielectric change resulting from the load absorbing energy in the work circuit, the variable condenser can be unmeshed to lower the total wave length of the circuit.

The adjustable grid taps 1 and 2 act as a fulcrum for keeping the work circuit and plate tank circuit in balance with respect to each other. As dielectric resistance increase causes the voltage and current curves to come more into phase with each other, the inductance power curve peaks will also shift and they will come fully into position with the grid tap positions and this will increase the grid excitation which in turn will cause the tubes T and T' to deliver their greatest restorative force to the circuit. Meters in grid and plate circuits will show a simultaneous rise in current flowing in both the plate tank circuit and in the combined grid-out-put circuit.

The dielectric may be most any shape, such as a long strip of wood or plywood, and means, shown in our copending application on a wood drying machine, Serial No. 432,936, filed March 2, 1942, or any other means may be used for moving the dielectric at a desired speed through the capacitance W.

We claim:

1. A plurality of vacuum tubes having cathodes connected together and having grids and anodes, an inductance connected between said anodes, an inductive means and a load connected in series, said load connection being adjustable along the end portions of said inductive means, connections from said grids to adjustable points along said inductive means, and said first inductance being coupled to an intermediate portion of said inductive means.

2. In a device of the type described, an inductive means and a load in series, means to adjust the amount of inductance in series with said load, a second inductance in close inductive relation with the center portion only of the first inductance, a plurality of vacuum tubes including plates with the second inductance connected between the plates of the vacuum tubes and constituting a part of the self-excited radio frequency oscillator in which the first-named inductive means becomes a part, and a connection between each grid and a point on said first inductance away from said center portion.

3. In a self-excited oscillator including vacuum tubes with grids and plates, two inductive means, the first being connected between the plates of the vacuum tubes and constituting a part of said oscillator and the second inductance having a load in series therewith adjustable along the extremities of said second inductance wherein the grids of the vacuum tubes constituting a part of the oscillator connect adjustably along parts of said second inductance away from its center or intermediate portion and between said center and the extremity which attaches to the load, the center portion of which second inductance being coupled to an intermediate portion of said first inductance.

4. A radio frequency circuit comprising a capacitance in series with an inductance, said inductance having a current anti-nodal point, a master oscillator including a plate tank circuit having an inductance with its current anti-nodal point inductively coupled to the current anti-nodal point of the first-named inductance, said master oscillator including a grid circuit with taps connected to the first-named inductance at the two greatest points of energy loss, said capacitance being adapted to receive a dielectric to bring the first circuit into balance and resonance with the master oscillator.

5. A radio frequency circuit comprising a capacitance in series with an inductance, said inductance having a current anti-nodal point, a master oscillator including a plate tank circuit having an inductance with its current anti-nodal point inductively coupled to the current anti-nodal point of the first-named inductance, said master oscillator including a grid circuit with taps connected to the first-named inductance at the two greatest points of energy loss, said first-named inductance being adapted to receive a conductor to bring the first circuit into balance and resonance with the master oscillator.

JULIUS W. MANN.
GEO. F. RUSSELL.

REFERENCES CITED

The following references are of record in the file of this patent:

UNITED STATES PATENTS

| Number | Name | Date |
| --- | --- | --- |
| 1,966,616 | David | July 17, 1934 |
| 1,997,019 | Schloemilch | Apr. 9, 1935 |
| 2,103,440 | Weissenberg | Dec. 28, 1937 |
| 2,130,758 | Rose | Sept. 20, 1938 |
| 2,276,994 | Milinowski | Mar. 17, 1942 |
| 2,382,435 | Mann et al. | Aug. 14, 1945 |